(12) United States Patent
Bailey

(10) Patent No.: US 9,162,144 B2
(45) Date of Patent: Oct. 20, 2015

(54) PORTABLE DEVICE PAIRING WITH A TRACKING SYSTEM

(75) Inventor: Richard St. Clair Bailey, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 926 days.

(21) Appl. No.: 13/311,408

(22) Filed: Dec. 5, 2011

(65) Prior Publication Data

US 2013/0141325 A1   Jun. 6, 2013

(51) Int. Cl.
| | |
|---|---|
| A63F 13/30 | (2014.01) |
| A63F 13/20 | (2014.01) |
| A63F 13/40 | (2014.01) |
| G06F 3/01 | (2006.01) |
| G06F 3/0346 | (2013.01) |

(52) U.S. Cl.
CPC ............... *A63F 13/12* (2013.01); *A63F 13/06* (2013.01); *A63F 13/10* (2013.01); *G06F 3/017* (2013.01); *G06F 3/0346* (2013.01); *A63F 2300/1087* (2013.01); *A63F 2300/6045* (2013.01); *G06F 2200/1637* (2013.01)

(58) Field of Classification Search
CPC ......... A63F 13/12; A63F 13/06; A63F 13/10; G06F 3/017; G06F 3/0346
See application file for complete search history.

(56) References Cited

U.S. PATENT DOCUMENTS

| | | | |
|---|---|---|---|
| 7,817,991 B2 | 10/2010 | Hinckley et al. | |
| 7,907,901 B1* | 3/2011 | Kahn et al. | 455/41.2 |
| 8,843,649 B2 | 9/2014 | Bailey | |
| 2005/0066331 A1 | 3/2005 | Inoue et al. | |
| 2007/0170238 A1 | 7/2007 | Piersol et al. | |
| 2009/0031258 A1* | 1/2009 | Arrasvuori et al. | 715/863 |
| 2009/0034591 A1 | 2/2009 | Julian et al. | |
| 2009/0054077 A1 | 2/2009 | Gauthier et al. | |
| 2009/0088197 A1 | 4/2009 | Stewart | |
| 2009/0131151 A1 | 5/2009 | Harris et al. | |
| 2009/0133499 A1 | 5/2009 | Cato | |
| 2010/0043056 A1 | 2/2010 | Ganapathy | |
| 2010/0082712 A1 | 4/2010 | Pratt et al. | |
| 2010/0082990 A1 | 4/2010 | Grigorovitch | |
| 2010/0130298 A1 | 5/2010 | Dugan et al. | |
| 2011/0059769 A1 | 3/2011 | Brunolli | |
| 2011/0093227 A1 | 4/2011 | Huang et al. | |
| 2011/0102459 A1 | 5/2011 | Hall | |

(Continued)

OTHER PUBLICATIONS

"Notice of Allowance", U.S. Appl. No. 13/154,709, May 28, 2014, 13 pages.

(Continued)

*Primary Examiner* — Latanya Bibbins

(74) *Attorney, Agent, or Firm* — John Jardine; Kate Drakos; Micky Minhas

(57) ABSTRACT

In embodiments of portable device pairing with a tracking system, a pairing system includes a portable device that generates device acceleration gesture data responsive to a series of motion gestures of the portable device. The pairing system also includes a tracking system that is configured for pairing with the portable device. The tracking system recognizes the series of motion gestures of the portable device and generates tracked object position gesture data. A pairing service can then determine that the series of motion gestures of the portable device corresponds to the series of motion gestures recognized by the tracking system, and communicate a pairing match notification to both the tracking system and the portable device to establish the pairing.

13 Claims, 7 Drawing Sheets

(56) References Cited

U.S. PATENT DOCUMENTS

| | | | |
|---|---|---|---|
| 2011/0159813 A1 | 6/2011 | Mallinson et al. | |
| 2012/0050153 A1* | 3/2012 | Dvortsov et al. | 345/156 |
| 2012/0083209 A1* | 4/2012 | Giles et al. | 455/41.2 |
| 2012/0124662 A1* | 5/2012 | Baca et al. | 726/17 |
| 2012/0317297 A1 | 12/2012 | Bailey | |
| 2013/0065517 A1* | 3/2013 | Svensson et al. | 455/39 |

OTHER PUBLICATIONS

Shen, et al., "Dita: Enabling Gesture-based Human-Device Interaction using Mobile Phone", Retrieved at <<http://research.microsoft.com/en-us/people/jackysh/dita.pdf>>, Retrieved Date: Aug. 26, 2011, pp. 1-14.

Malfatti, "Using Mobile Phones to Control Desktop Multiplayer Games", Retrieved at http://nti.catolica-to.edu.br/Material/Artigos/MobilePhonesControl.pdf>>, Brazilian Symposium on Games and Digital Entertainment (SBGAMES), Nov. 8-10, 2010, pp. 7.

"Establishment of a Pairing Relationship Between Two or More", U.S. Appl. No. 13/154,709, filed Jun. 7, 2011, pp. 24.

Chong, Ming K., et al., "GesturePIN: Using Discrete Gestures for Associating Mobile Devices", *MobileHCI '10*, Sep. 7-10, 2010, Lisbon, Portugal, available at <http://pubs.cs.uct.ac.za/archive/00000627/01/p261.pdf>,(Sep. 7, 2010), pp. 261-264.

Chong, Ming K., et al., "How Users Associate Wireless Devices", *CHI 2011*, May 7-12, 2011, Vancouver, BC, Canada, available at <http://mingkichong.ent/wp-content/uploads/2011/01/chi2011-paper.pdf>,(May 7, 2011), 10 pages.

Mayrhofer, Rene et al., "Shake Well before Use: Intuitive and Secure Pairing of Mobile Devices", *IEEE Transactions on Mobile Computing*, vol. 8, No. 6, available at <http://eprints.comp.lancs.ac.uk/2230/1/TMC-2008-07-0279-3.pdf>,(Jun. 2009),pp. 792-806.

Peng, Chunyi et al., "Point&Connect: Intention-based Device Pairing for Mobile Phone Users", *MobiSys '09*, Jun. 22-25, 2009, Krakow, Poland, available at <http://citeseerx.ist.psu.edu/viewdoc/download?doi=10.1.1.160.796&rep=rep1&type=pdf> ,(Jun. 22, 2009), pp. 137-149.

Saxena, Nitesh et al., "Secure Device Pairing Based on a Visual Channel", *IEEE Symposium on Security and Privacy*, 2006, Available at <http://eprint.iacr.org/2006/050.pdf>,(May 2006), pp. 1-17.

Wilson, Andrew D., et al., "BlueTable: Connecting Wireless Mobile Devices on Interactive Surfaces Using Vision-Based Handshaking", available at <http://research.microsoft.com/en-us/um/people/awilson/publications/wilsongi2007/GI%202007.pdf>,(May 28, 2007), 7 pages.

"Non-Final Office Action", U.S. Appl. No. 13/154,709, (May 10, 2013),13 pages.

"Non-Final Office Action", U.S. Appl. No. 13/154,709, Nov. 22, 2013, 14 Pages.

* cited by examiner

PORTABLE DEVICE PAIRING WITH A TRACKING SYSTEM

BACKGROUND

A gaming system can interpret gestures based on 3D motion capture, facial recognition, and/or voice recognition with various implementations of software and components, such as sensors, cameras, microphones, and other system input components. Modern gaming controllers are wireless, and can be paired with a gaming system by initiating both a game controller and the gaming system to recognize and communicate with each other. Further, advances in gaming systems have developed to recognize and track individual user movements, such as with motion-sensing, hands-free tracking systems that can track the spatial position of a user and translate user movements into a gaming scenario.

SUMMARY

This Summary introduces simplified concepts of portable device pairing with a tracking system, and the concepts are further described below in the Detailed Description and/or shown in the Figures. This Summary should not be considered to describe essential features of the claimed subject matter, nor used to determine or limit the scope of the claimed subject matter.

Portable device pairing with a tracking system is described. In embodiments, a pairing system includes a portable device that generates device acceleration gesture data responsive to a series of motion gestures of the portable device. The pairing system also includes a tracking system that is configured for pairing with the portable device. The tracking system recognizes the series of motion gestures of the portable device and generates tracked object position gesture data. A pairing service can then determine that the series of motion gestures of the portable device corresponds to the series of motion gestures recognized by the tracking system, and communicate a pairing match notification to both the tracking system and the portable device to establish the pairing. In implementations, the tracking system can include the pairing service. Alternatively, the pairing service is a networked-based service configured for communication with the tracking system and with the portable device.

In other embodiments, the pairing service receives the device acceleration gesture data from the portable device, and generates plane aligned device gesture data by normalizing the device acceleration gesture data. The pairing service also receives the tracked object position gesture data from the tracking system, integrates the tracked object position gesture data to generate tracked object acceleration gesture data, and then generates plane aligned object gesture data by normalizing the tracked object acceleration gesture data. The pairing service can then determine a pairing match of the portable device with the tracking system by comparing the plane aligned device gesture data to the plane aligned object gesture data. The plane aligned device gesture data and the plane aligned object gesture data is generated based on an X,Y plane of the series of motion gestures, and Z-coordinate motions from the series of motion gestures are minimized from the processing. Alternatively, other implementations may include processing in the three X,Y,Z dimensions.

In alternate embodiments, the portable device generates the plane aligned device gesture data from the device acceleration gesture data. The tracking system integrates the tracked object position gesture data to generate the tracked object acceleration gesture data, and then the tracking system generates the plane aligned object gesture data from the tracked object acceleration gesture data. The pairing service receives the plane aligned device gesture data from the portable device, and receives the plane aligned object gesture data from the tracking system. The pairing service can then determine a pairing match of the portable device with the tracking system by comparing the plane aligned device gesture data to the plane aligned object gesture data.

BRIEF DESCRIPTION OF THE DRAWINGS

Embodiments of portable device pairing with a tracking system are described with reference to the following Figures. The same numbers may be used throughout to reference like features and components that are shown in the Figures.

DETAILED DESCRIPTION

Figure 1:
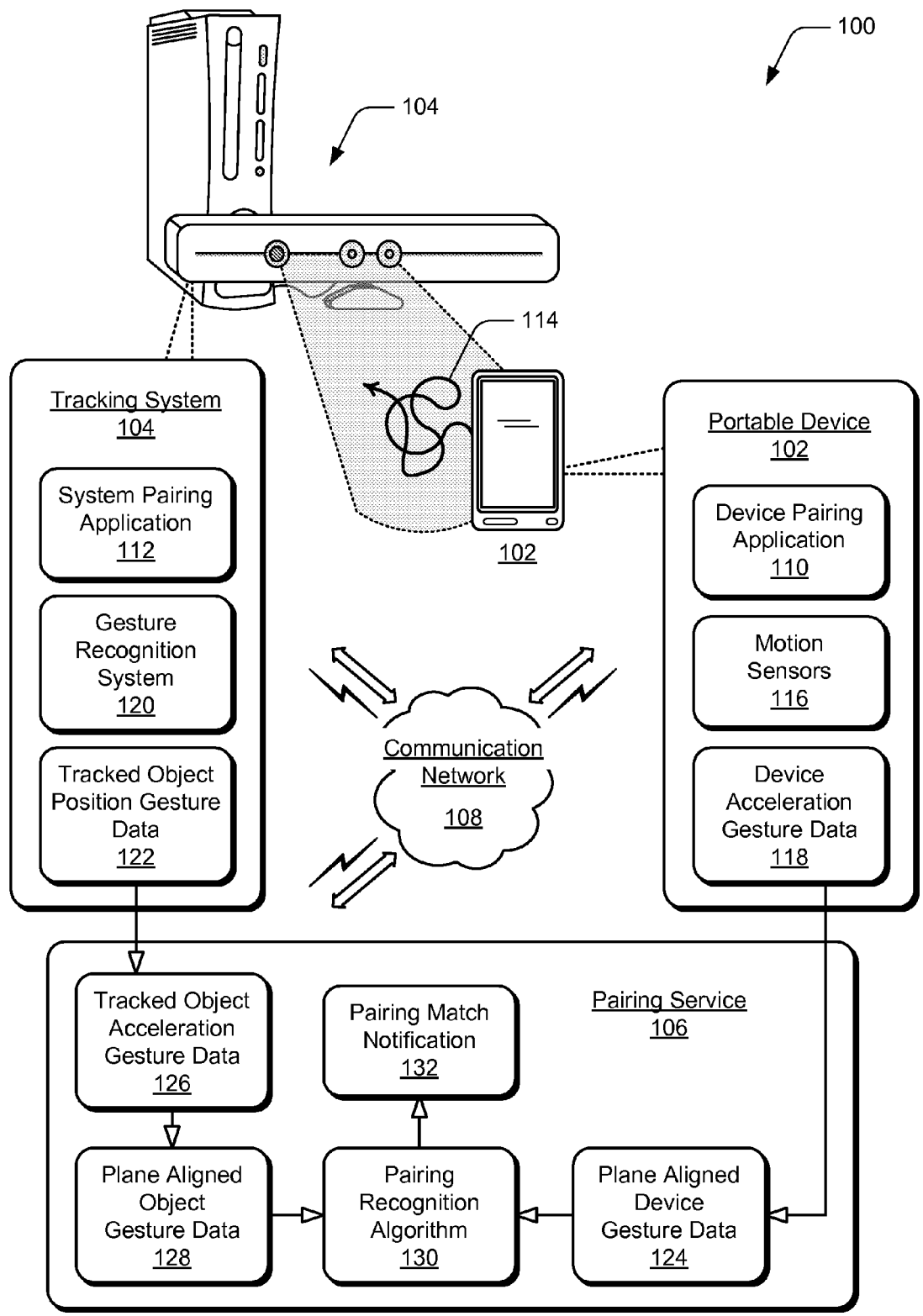
FIG. 1 illustrates an example pairing system in which embodiments of portable device pairing with a tracking system can be implemented.

Embodiments of portable device pairing with a tracking system are described. A user carrying a portable device, such as mobile phone, tablet PC, or other similar device, can initiate paring the portable device with a tracking system with a simple series of motion gestures in a random pattern. The portable device generates device acceleration gesture data that represents the series of motion gestures. The tracking system recognizes the series of motion gestures and generates tracked object (e.g., the portable device or user's hand) position gesture data that represents the series of motion gestures. A pairing service can then compare the device gesture data from the portable device to the object gesture data from the tracking system and make a determination that the series of motion gestures of the portable device corresponds to the series of motion gestures recognized by the tracking system. The pairing service can then communicate a pairing match notification to both the tracking system and the portable device to establish pairing the portable device with the tracking system. This gesture-initiated pairing extends user interaction with a tracking system, such as a gaming system, onto a user's portable device, such as a mobile phone, tablet PC, or other similar device.

In implementations, the motion sequences of accelerations for multiple devices can be recognized by a tracking system, compared, and the portable device that each user is holding can be identified and paired with the tracking system. When the mobile phones for each user are identified, the user experience can be extended to each user's respective device to display player confidential information, gaming configuration features, or other information and features not well suited for display to everyone, such as on a primary gaming display that all participants in a gaming scenario can view.

For example, an auto racing game may allow the players the ability to tune each of their race cars just prior to starting a race. With a racing game companion application on a mobile phone, each player can pair his or her device with the gaming system, and then set the tuning parameters and auto racing configurations known only to the player who is setting the parameters and configurations. In another gaming example, two players with a football game companion application on each mobile device can select plays without the other player being able to see the play selection before a play is executed. For example, the player currently on offense can select an offensive play that the player currently on defense will not see on the primary gaming display, and similarly, the player currently on defense can select a defensive play that the offensive player will not see.

In other implementations, a tracking system can be implemented as a kiosk device, such as in a store front, and a user with a portable device can walk-up and initiate pairing the device with the tracking system. Once paired, the user may receive an instant coupon for the store on the portable device, such as in the form of a text, email, or via a coupon application on the device. The user may also receive information about products in the particular store and/or products targeted to a particular user based on user data that may be associated with the portable device. In another example, a security guard may be easily authenticated at various kiosk checkpoints throughout a property, such as a shopping mall or auto dealer, as the security guard makes a security check around the property. The security guard can briefly stop at each checkpoint and initiate pairing a portable device with the tracking system at each kiosk checkpoint. In this scenario, the purpose of the gesture matching at a checkpoint may be considered more of an acknowledgement or signature, rather than a one-time pairing of the devices.

While features and concepts of portable device pairing with a tracking system can be implemented in any number of different devices, systems, networks, environments, and/or configurations, embodiments of portable device pairing with a tracking system are described in the context of the following example devices, systems, and methods.

FIG. 1 illustrates an example pairing system 100 in which various embodiments of portable device pairing with a tracking system can be implemented. The example pairing system includes a portable device 102 which may be any one or combination of a mobile phone, entertainment device, navigation device, user device, wireless device, tablet computer, and the like that is portable and includes an integrated display. The example pairing system also includes a tracking system 104, and a pairing service 106 that may be implemented as an independent service separate from the tracking system and the portable device (e.g., on a separate server, by a third party service, or as a network-based service). Any of the devices and/or services can be implemented with various components, such as one or more processors and memory devices, as well as any number and combination of differing components as further described with reference to the example device shown in FIG. 7 to implement embodiments of portable device pairing with a tracking system.

Any of the services and devices can communicate via a communication network 108, which can be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider. A mobile operator can facilitate mobile data and/or voice communication for any type of a wireless device or mobile phone (e.g., cellular, VoIP, WiFi, etc.).

The portable device 102 includes a device pairing application 110, and similarly, the tracking system 104 includes a system pairing application 112. Each of the pairing applications can be implemented as computer-executable instructions, such as a software application, and executed by one or more processors to implement the various embodiments described herein. In embodiments, the pairing applications are implemented to initiate and manage pairing the tracking system with the portable device.

To initiate pairing the portable device 102 with the tracking system 104, a user holding the portable device can make a series of motion gestures 114 in a random pattern. In this example, the portable device includes one or more motion sensors 116, and device acceleration gesture data 118 is generated responsive to the series of motion gestures of the portable device. The motion sensors can include an accelerometer or any other type of motion sensor. The tracking system 104 includes a gesture recognition system 120 that is implemented to recognize the series of motion gestures 114 of the portable device and generate tracked object position gesture data 122. The gesture recognition system can include any type of motion detection features and/or devices that recognize motion gestures, such as sensors, cameras, and/or other motion detection components. In implementations, the tracking system can skeleton track the spatial positions of a user's hand over time and compute the velocities and accelerations of the hand that is holding the portable device. In this example, a tracked object may be the portable device and/or the user's hand that is holding the portable device.

The pairing service 106 receives the device acceleration gesture data 118 from the portable device 102, and receives the tracked object position gesture data 122 from the tracking system 104. The pairing service is implemented to generate plane aligned device gesture data 124 by normalizing the device acceleration gesture data that is received from the portable device. For example, the phone accelerometer data is normalized (e.g., rotated) to align the series of motion gestures with the axis of gravity to represent a majority of the motion gestures in a single X,Y plane, and minimize or eliminate Z-coordinate motions from the series of motion gestures.

Generally, a tracking system can readily recognize motions in an X,Y plane (i.e., a vertical X,Y plane with respect to a user standing in front of the tracking system). The Z-coordinate motions, such as when the user moves the portable device forward towards the tracking system and back away from the tracking system, are less discernible. Eliminating or minimizing the Z-coordinate motions from the series of motion gestures simplifies the processing to differentiate and compare the gesture data received from both the portable device and the tracking system. However, alternate implementations may include processing in the three X,Y,Z dimensions.

The pairing service 106 is also implemented to integrate the tracked object position gesture data 122 that is received from the tracking system 104 to generate tracked object acceleration gesture data 126. The pairing service can then generate plane aligned object gesture data 128 by normalizing the tracked object acceleration gesture data. For example, the tracking system object position data (e.g., corresponding to the user's hand or portable device) is integrated from position data to acceleration data, and then the acceleration data is normalized (e.g., rotated) to align with the floor plane normal axis to represent a majority of the motion gestures in a single X,Y plane, and minimize or eliminate Z-coordinate motions from the series of motion gestures.

The pairing service 106 includes a pairing recognition algorithm 130 that is implemented to compare the plane aligned device gesture data 124 to the plane aligned object gesture data 128, and can then determine a pairing match of the portable device 102 with the tracking system 104. For example, the pairing recognition algorithm 130 can be implemented as a dynamic time warping (DTW) algorithm, and the gesture data from the tracking system 104 is compared against recent gesture data from the portable device, or from multiple portable devices, to find a match. Other techniques for data normalization and sequence matching may be implemented by the pairing service. The pairing service can then determine that the series of motion gestures 114 of the portable device corresponds to the series of motion gestures recognized by the tracking system. The pairing service 106 can then communicate a pairing match notification 132 to both the tracking system and the portable device to establish pairing the portable device with the tracking system.

Figure 2:
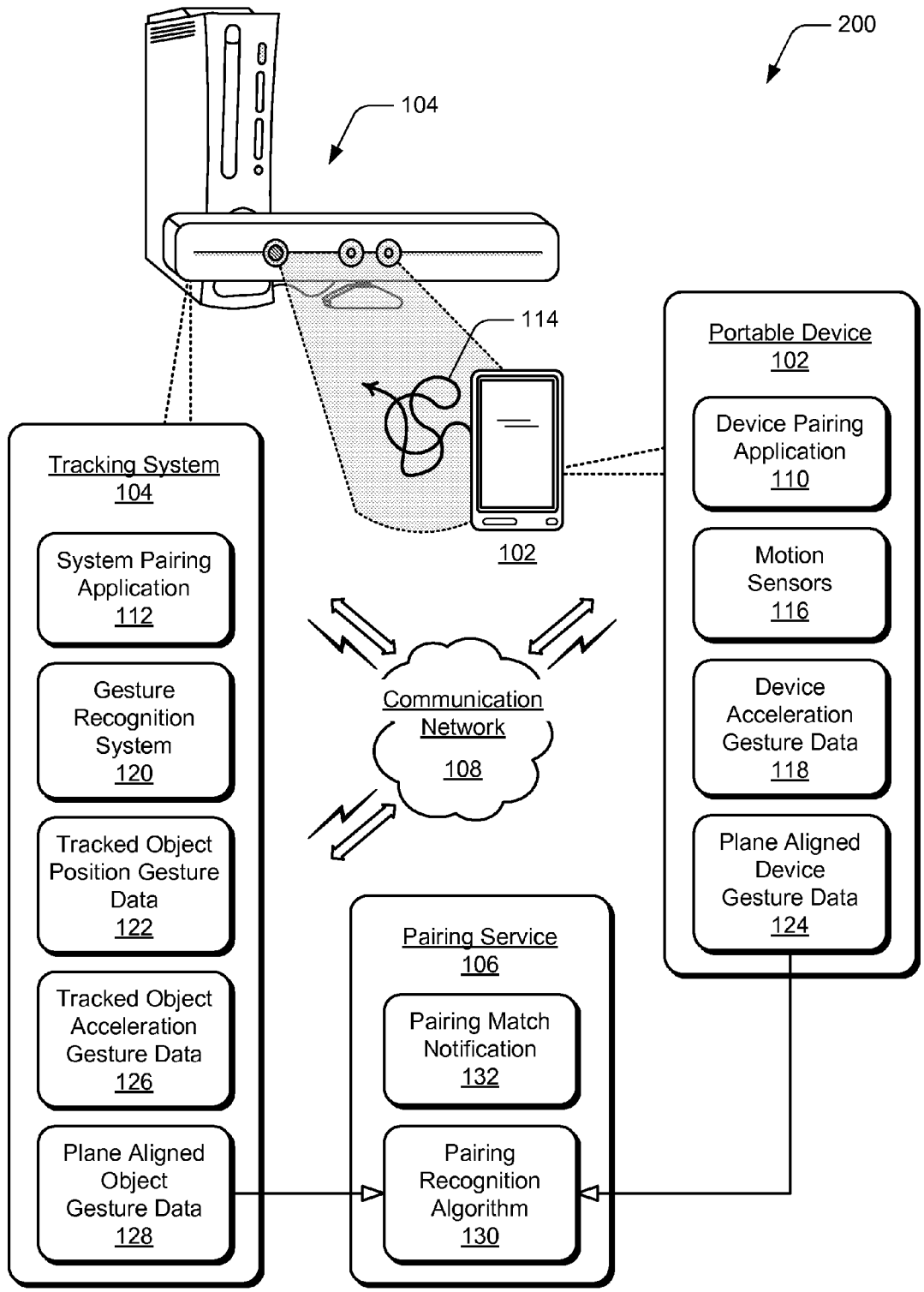
FIG. 2 illustrates an implementation of the example pairing system in accordance with one or more embodiments.

FIG. 2 further illustrates an implementation 200 of the example pairing system 100 described with reference to FIG. 1. In this implementation, the portable device 102 and the tracking system 104 pre-process the respective gesture data before communicating the gesture data to the pairing service 106. For example, the portable device generates the plane aligned device gesture data 124 from the device acceleration gesture data 118. Further, the tracking system integrates the tracked object position gesture data 122 to generate the tracked object acceleration gesture data 126, and then generates the plane aligned object gesture data 128 from the tracked object acceleration gesture data.

The pairing service 106 receives the plane aligned device gesture data 124 from the portable device 102, and receives the plane aligned object gesture data 128 from the tracking system 104. The pairing service can then determine a pairing match of the portable device with the tracking system by comparing the plane aligned device gesture data to the plane aligned object gesture data. The pairing service 106 then communicates the pairing match notification 132 to both the tracking system and the portable device to establish pairing the portable device with the tracking system.

Figure 3:
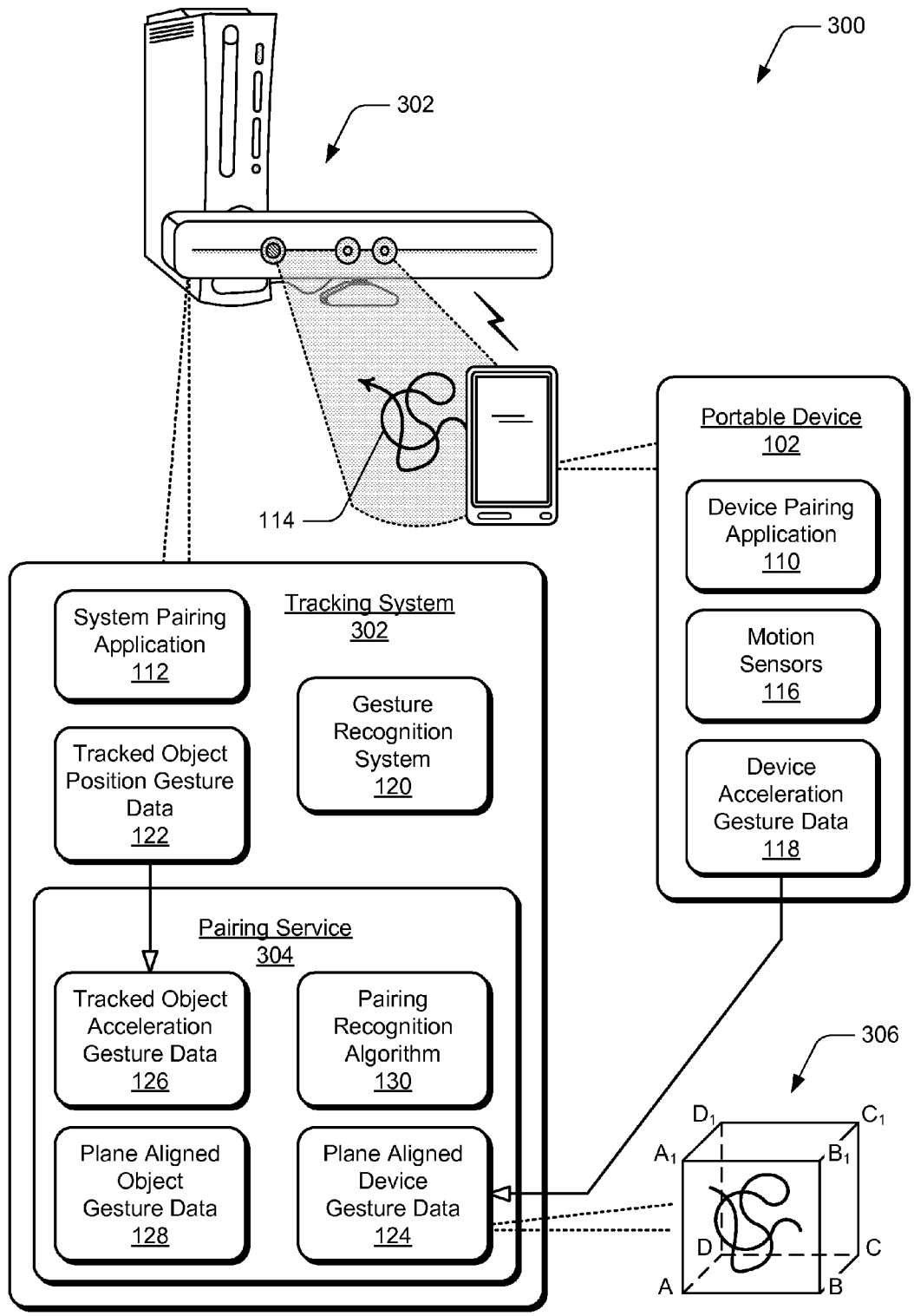
FIG. 3 illustrates another example pairing system in accordance with one or more embodiments.

FIG. 3 illustrates an example pairing system 300 in which various embodiments of portable device pairing with a tracking system can be implemented. The example pairing system includes the portable device 102 as described with reference to FIG. 1. In this example, a tracking system 302 includes a pairing service 304. The tracking system and the pairing service may be implemented as generally described with reference to the tracking system 104 and the pairing service 106 shown in FIG. 1. In this example, the portable device 102 can communicate directly with the tracking system 302 to initiate pairing, such as via a direct communication technology. Alternatively or in addition, the portable device and tracking system can communicate via other communication networks, such as the communication network 108 described with reference to FIG. 1.

The portable device 102 generates the device acceleration gesture data 118 responsive to the series of motion gestures 114 of the portable device, and communicates the device acceleration gesture data to the pairing service 304 of the tracking system 302. The gesture recognition system 120 of the tracking system 104 recognizes the series of motion gestures 114 of the portable device, and the tracking system generates the tracked object position gesture data 122. The pairing service processes the gesture data received from the portable device and the tracking system as described with reference to FIG. 1. An example of the plane aligned object gesture data and the plane aligned device gesture data is shown at 306. The tracking system can compare the object gesture data and the device gesture data, and determine that the series of motion gestures 114 of the portable device corresponds to the series of motion gestures recognized by the tracking system. The tracking system can then communicate a pairing match notification to the portable device to establish pairing the portable device with the tracking system.

Example methods 400, 500, and 600 are described with reference to FIGS. 4, 5, and 6 in accordance with one or more embodiments of portable device pairing with a tracking system. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
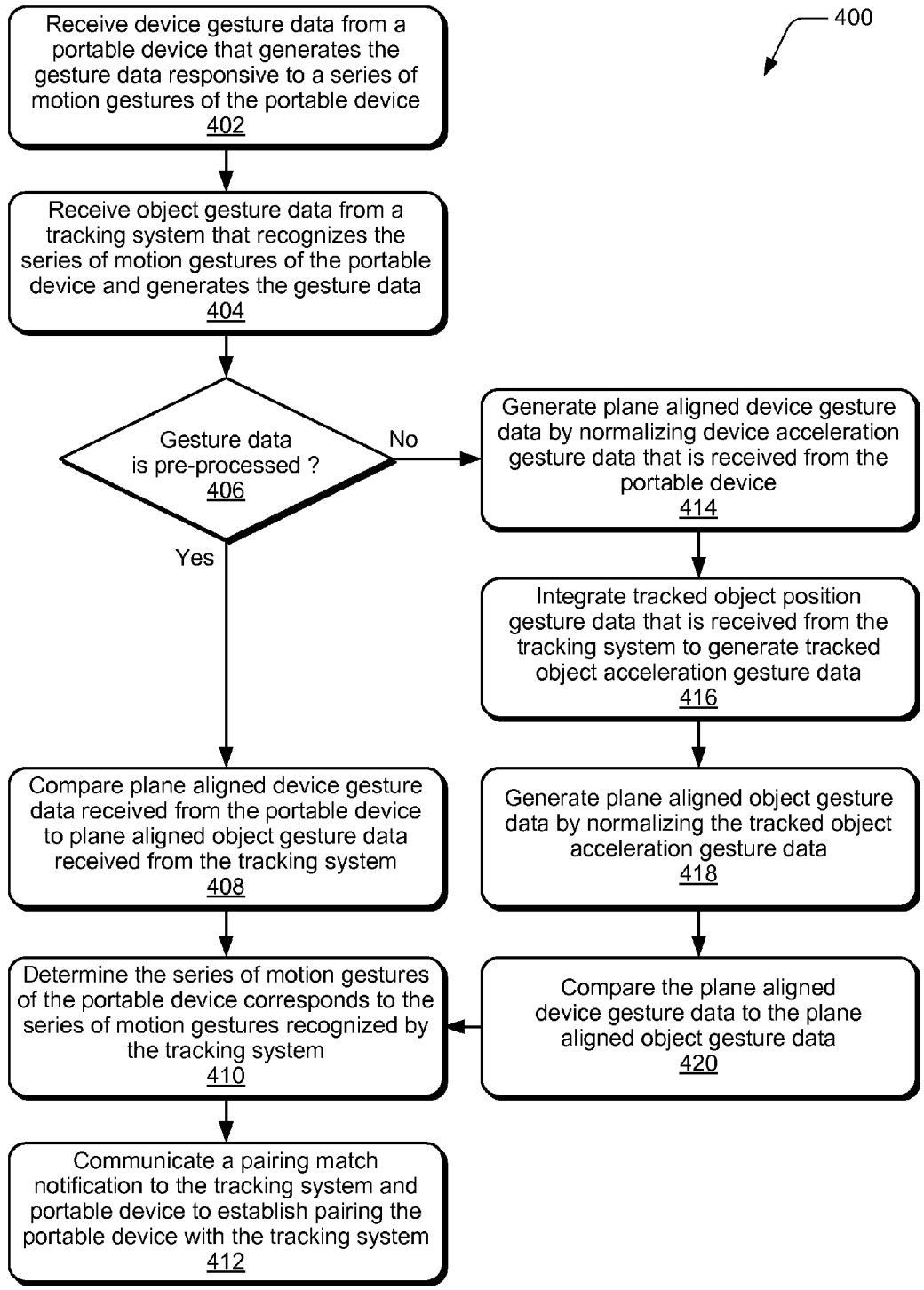
FIG. 4 illustrates example method(s) of a pairing service for portable device pairing with a tracking system in accordance with one or more embodiments.

FIG. 4 illustrates example method(s) 400 of portable device pairing with a tracking system, and is directed to a pairing service. The order in which the method blocks are described are not intended to be construed as a limitation, and any number of the described method blocks can be combined in any order to implement a method, or an alternate method.

At block 402, device gesture data is received from a portable device that generates the device gesture data responsive to a series of motion gestures of the portable device. For example, the pairing service 106 (FIG. 1) receives the device acceleration gesture data from the portable device 102. The device acceleration gesture data is generated by the portable device responsive to the series of motion gestures 114 of portable device, such as when a user holding the portable device initiates the series of motion gestures in a random pattern. Alternatively, the pairing service 106 (FIG. 2) receives the plane aligned device gesture data 124 from the portable device when the portable device is implemented to pre-process the device acceleration gesture data and generate the plane aligned device gesture data.

At block 404, object gesture data is received from a tracking system that recognizes the series of motion gestures of the portable device and generates the object gesture data. For example, the pairing service 106 (FIG. 1) receives the tracked object position gesture data 122 from the tracking system 104. The gesture recognition system 120 of the tracking system recognizes the series of motion gestures 114 of the portable device and the tracked object position gesture data is generated. Alternatively, the pairing service 106 (FIG. 2) receives the plane aligned object gesture data 128 from the tracking system when the tracking system is implemented to pre-process the tracked object position gesture data and generate the plane aligned object gesture data.

At block 406, a determination is made as to whether the device gesture data and the object gesture data is received pre-processed from the portable device and the tracking system, respectively. If the device gesture data and the object gesture data is received pre-processed from the portable device and the tracking system (i.e., "yes" from block 406), then at block 408, plane aligned device gesture data received from the portable device is compared to plane aligned object gesture data received from the tracking system. For example, the pairing recognition algorithm 130 of the pairing service 106 (FIG. 2) compares the plane aligned device gesture data 124 that is received from the portable device to the plane aligned object gesture data 128 that is received from the tracking system.

At block 410, the series of motion gestures of the portable device is determined to correspond to the series of motion gestures recognized by the tracking system. For example, the pairing service 106 determines that the series of motion gestures 114 of the portable device 102 corresponds to the series of motion gestures recognized by the tracking system 104. At block 412, a pairing match notification is communicated to both the tracking system and the portable device to establish pairing the portable device with the tracking system. For example, the pairing service 106 communicates the pairing match notification 132 to both the tracking system 104 and the portable device 102 to establish pairing the portable device with the tracking system.

If the device gesture data and the object gesture data is not received pre-processed from the portable device and the tracking system, respectively (i.e., "no" from block 406), then the device acceleration gesture data 118 is received from the portable device 102 (FIG. 1), and the tracked object position gesture data 122 is received from the tracking system 104. At block 414, plane aligned device gesture data is generated by normalizing device acceleration gesture data that is received from the portable device. For example, the pairing service 106 generates the plane aligned device gesture data 124 by normalizing the device acceleration gesture data 118 that is received from the portable device. The phone accelerometer data is normalized (e.g., rotated) to align the series of motion gestures with the axis of gravity to represent a majority of the motion gestures in a single X,Y plane, and minimize or eliminate the Z-coordinate motions from the series of motion gestures for processing.

At block 416, tracked object position gesture data that is received from the tracking system is integrated to generate tracked object acceleration gesture data. For example, the pairing service 106 integrates the tracked object position gesture data 122 that is received from the tracking system 104 to generate the tracked object acceleration gesture data 126. At block 418, plane aligned object gesture data is generated by normalizing the tracked object acceleration gesture data. For example, the pairing service generates the plane aligned object gesture data 128 by normalizing the tracked object acceleration gesture data. The tracking system object position data (e.g., corresponding to the user's hand or portable device) is integrated from position data to acceleration data, and then the acceleration data is normalized (e.g., rotated) to align with the floor plane normal axis to represent a majority of the motion gestures in a single X,Y plane, and minimize or eliminate the Z-coordinate motions from the series of motion gestures for processing.

At block 420, the plane aligned device gesture data is compared to the plane aligned object gesture data. For example, the pairing recognition algorithm 130 at the pairing service 106 compares the plane aligned device gesture data 124 to the plane aligned object gesture data 128, and the pairing service can determine a pairing match of the portable device 102 with the tracking system 104. The method continues at block 410 to determine that the series of motion gestures of the portable device corresponds to the series of motion gestures recognized by the tracking system, and at block 412 to communicate the pairing match notification to both the tracking system and the portable device.

Figure 5:
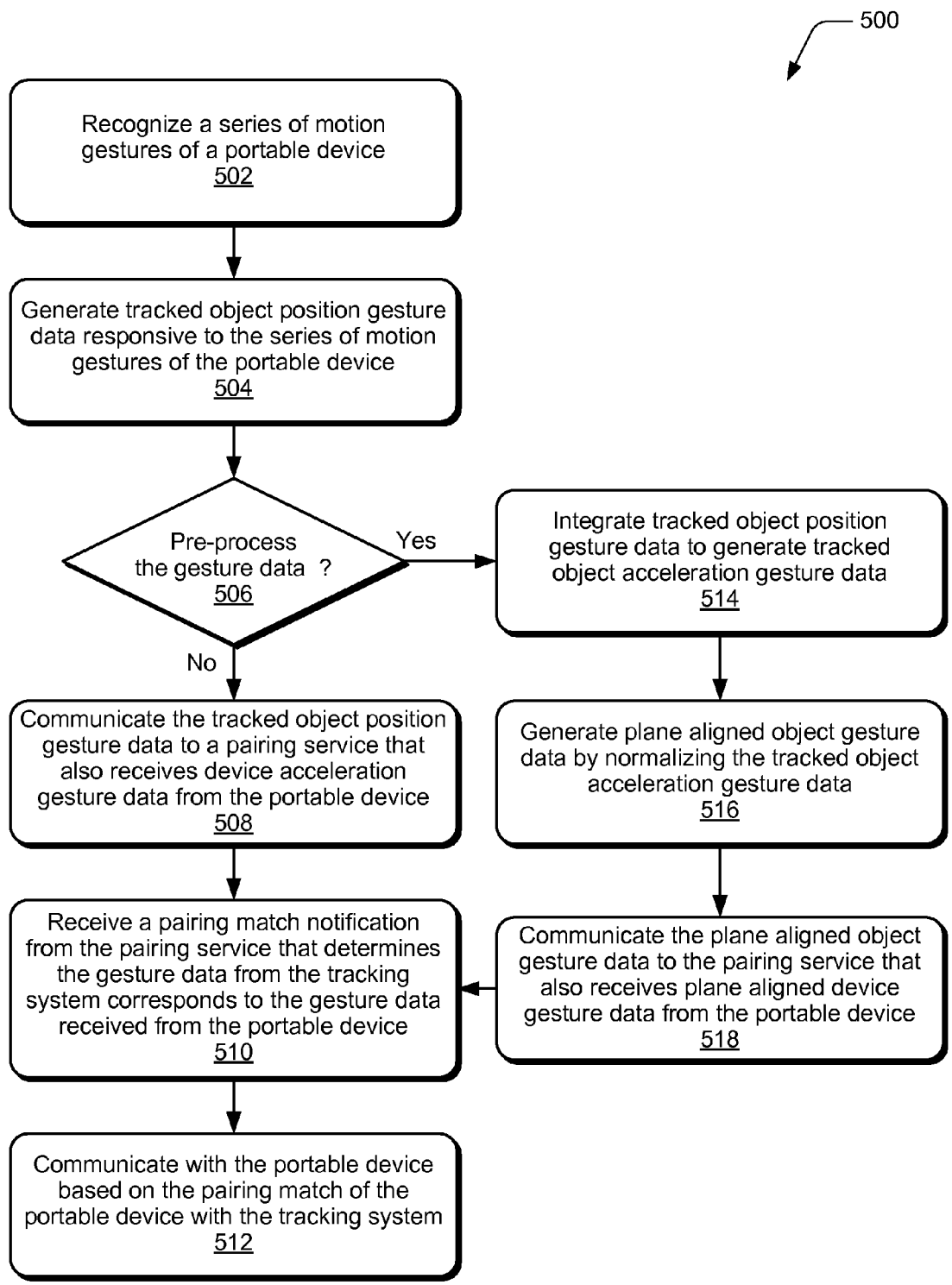
FIG. 5 illustrates example method(s) of a tracking system for portable device pairing with a tracking system in accordance with one or more embodiments.

FIG. 5 illustrates example method(s) 500 of portable device pairing with a tracking system, and is directed to a tracking system. The order in which the method blocks are described are not intended to be construed as a limitation, and any number of the described method blocks can be combined in any order to implement a method, or an alternate method.

At block 502, a series of motion gestures of a portable device is recognized and, at block 504, tracked object position gesture data is generated responsive to the series of motion gestures of the portable device. For example, the gesture recognition system 120 of the tracking system 104 (FIG. 1) recognizes the series of motion gestures 114 of the portable device 102 and the tracked object position gesture data 122 is generated.

At block 506, a determination is made as to whether to pre-process the tracked object position gesture data at the tracking system. For example, the tracking system 104 (FIG. 2) may be implemented to integrate the tracked object position gesture data 122 to generate the tracked object acceleration gesture data 126, and then generate the plane aligned object gesture data 128 from the tracked object acceleration gesture data.

If the tracking system does not pre-process the tracked object position gesture data (i.e., "no" from block 506), then at block 508, the tracked object position gesture data is communicated to a pairing service that also receives device acceleration gesture data from the portable device. For example, the tracking system 104 (FIG. 1) communicates the tracked object position gesture data 122 to the pairing service 106. The pairing service also receives the device acceleration gesture data 118 from the portable device 102.

At block 510, a pairing match notification is received from the pairing service that determines the gesture data from the tracking system corresponds to the gesture data received from the portable device. For example, the tracking system 104 receives the pairing notification 132 from the pairing service 106 that determines the gesture data from the tracking system corresponds to the gesture data received from the portable device. At block 512, the tracking system communicates with the portable device based on the pairing match of the portable device with the tracking system.

If the tracking system does pre-process the tracked object position gesture data (i.e., "yes" from block 506), then at block 514, the tracked object position gesture data is integrated to generate tracked object acceleration gesture data. For example, the tracking system 104 (FIG. 2) integrates the tracked object position gesture data 122 to generate the tracked object acceleration gesture data 126. At block 516, plane aligned object gesture data is generated by normalizing the tracked object acceleration gesture data. For example, the tracking system generates the plane aligned object gesture data 128 by normalizing the tracked object acceleration data.

At block 518, the plane aligned object gesture data is communicated to the pairing service that also receives plane aligned device gesture data from the portable device. For example, the tracking system 104 (FIG. 2) communicates the plane aligned object gesture data 128 to the pairing service 106. The method continues at block 510 to receive the pairing match notification from the pairing service, and at block 512 to communicate with the portable device based on the pairing match of the portable device with the tracking system.

Figure 6:
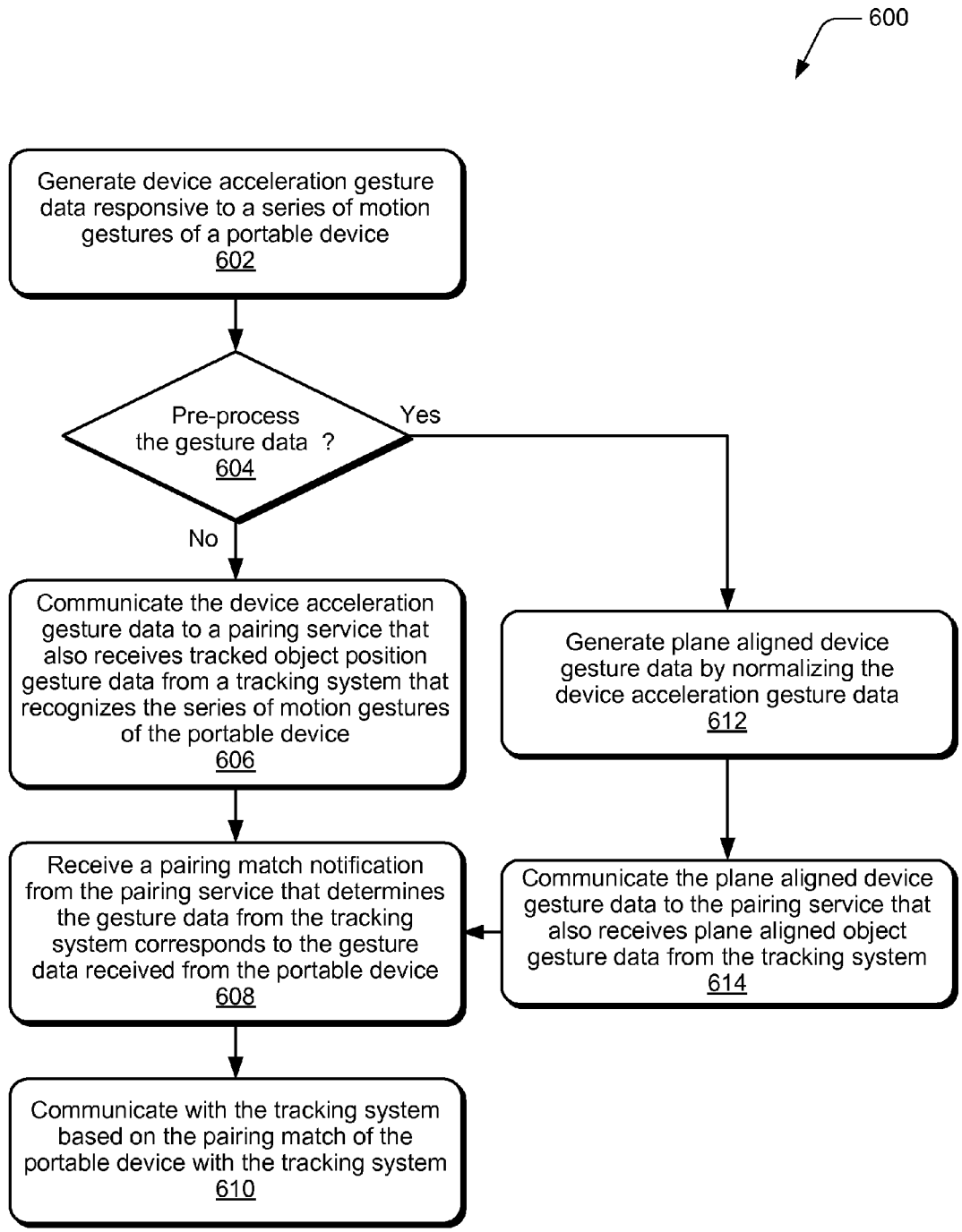
FIG. 6 illustrates example method(s) of a portable device for portable device pairing with a tracking system in accordance with one or more embodiments.

FIG. 6 illustrates example method(s) 600 of portable device pairing with a tracking system, and is directed to a portable device. The order in which the method blocks are described are not intended to be construed as a limitation, and any number of the described method blocks can be combined in any order to implement a method, or an alternate method.

At block 602, device acceleration gesture data is generated responsive to a series of motion gestures of a portable device. For example, the portable device 102 (FIG. 1) generates the device acceleration gesture data 118 responsive to the series of motion gestures 114 of portable device, such as when a user holding the portable device initiates the series of motion gestures in a random pattern.

At block 604, a determination is made as to whether to pre-process the device acceleration gesture data at the portable device. For example, the portable device 102 (FIG. 2) may be implemented to generate the plane aligned device gesture data 124 before the gesture data is communicated to the pairing service.

If the portable device does not pre-process the device acceleration gesture data (i.e., "no" from block 604), then at block 606, the device acceleration gesture data is communicated to the pairing service that also receives tracked object position gesture data from a tracking system that recognizes the series of motion gestures of the portable device. For example, the portable device 102 (FIG. 1) communicates the device acceleration gesture data 118 to the pairing service 106. The pairing service also receives the tracked object position gesture data 122 from the tracking system 104 that recognizes the series of motion gestures of the portable device.

At block 608, a pairing match notification is received from the pairing service that determines the gesture data from the tracking system corresponds to the gesture data received from the portable device. For example, the portable device 102 receives the pairing notification 132 from the pairing service 106 that determines the gesture data from the tracking system corresponds to the gesture data received from the portable device. At block 610, the portable device communicates with the tracking system based on the pairing match of the portable device with the tracking system.

If the portable device does pre-process the device acceleration gesture data yes (i.e., "yes" from block 604), then at block 612, plane aligned device gesture data is generated by normalizing the device acceleration gesture data. For example, the portable device 102 (FIG. 2) generates the plane aligned device gesture data 124 by normalizing the device acceleration gesture data 118.

At block 614, the plane aligned device gesture data is communicated to the pairing service that also receives plane aligned object gesture data from the tracking system. For example, the portable device 102 (FIG. 2) communicates the plane aligned device gesture data 124 to the pairing service 106. The method continues at block 608 to receive the pairing match notification from the pairing service, and at block 610 to communicate with the tracking system based on the pairing match of the portable device with the tracking system.

Figure 7:
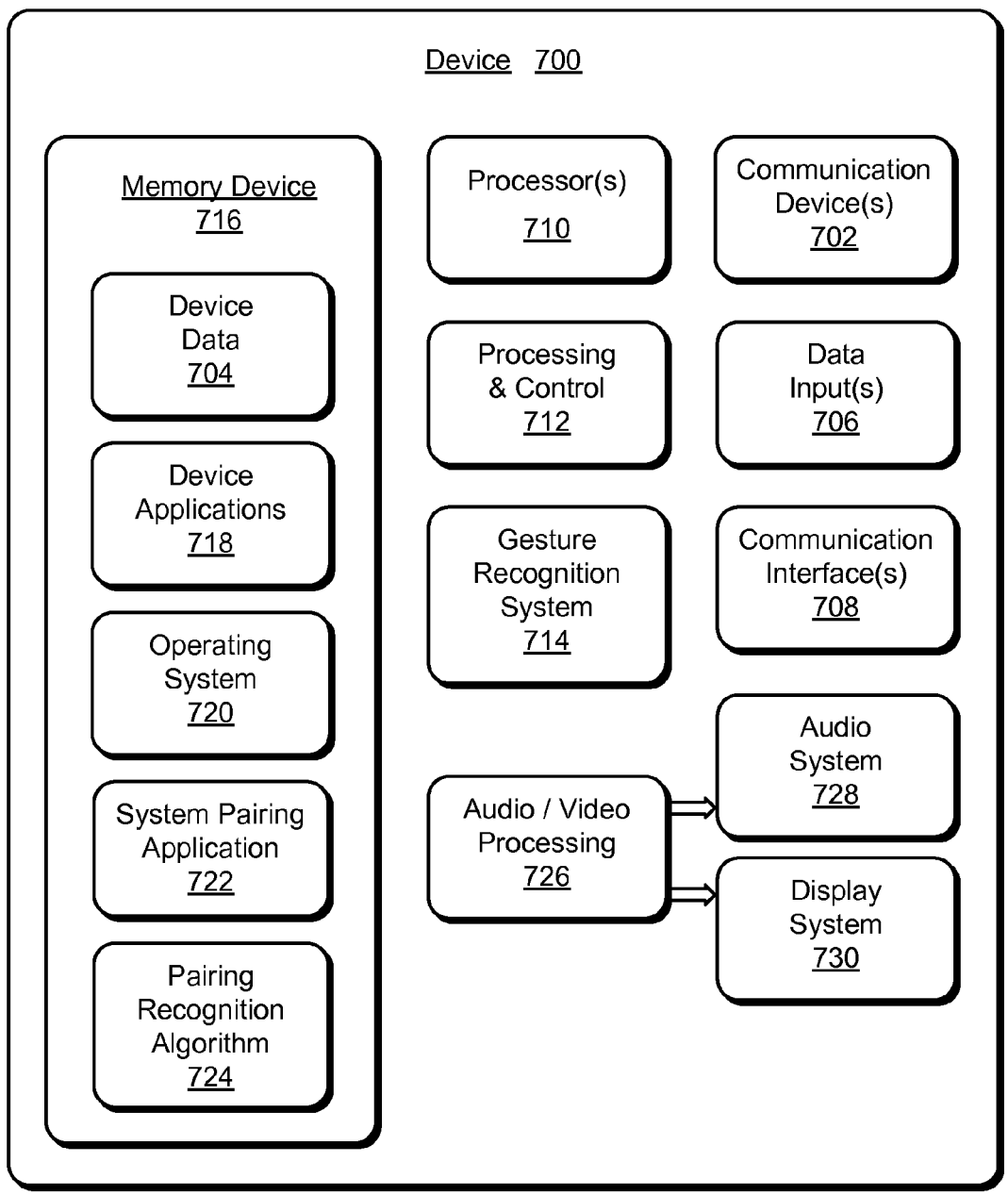
FIG. 7 illustrates various components of an example device that can implement embodiments of portable device pairing with a tracking system.

FIG. 7 illustrates various components of an example device 700 that can be implemented as any of the devices, or services implemented by devices, described with reference to the previous FIGS. 1-6. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 700 includes communication devices 702 that enable wired and/or wireless communication of device data 704, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 706 via which any type of data, media content, and/or inputs can be received, such as user-selectable inputs and any other type of audio, video, and/or image data received from any content and/or data source.

The device 700 also includes communication interfaces 708, such as any one or more of a serial, parallel, network, or wireless interface. The communication interfaces provide a connection and/or communication links between the device and a communication network by which other electronic, computing, and communication devices communicate data with the device.

The device 700 includes one or more processors 710 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 712. In embodiments, the device 700 can also include a gesture recognition system 714. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 700 also includes one or more memory devices 716 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 716 provides data storage mechanisms to store the device data 704, other types of information and/or data, and various device applications 718. For example, an operating system 720 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 718 include a system pairing application 722, such as implemented in a tracking system or portable device, and include a pairing recognition algorithm 724, such as implemented in a pairing service to implement embodiments as described herein.

The device 700 also includes an audio and/or video processing system 726 that generates audio data for an audio system 728 and/or generates display data for a display system 730. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of portable device pairing with a tracking system have been described in language specific to features and/or methods, the appended claims are not necessarily limited to the specific features or methods described. Rather, the specific features and methods are disclosed as example implementations of portable device pairing with a tracking system.

The invention claimed is:

1. A pairing system, comprising:
   a portable device configured to generate device acceleration gesture data responsive to a series of motion gestures of the portable device;
   a tracking system configured for pairing with the portable device, the tracking system further configured to recognize the series of motion gestures of the portable device and generate tracked object position gesture data; and
   a pairing service configured to determine that the series of motion gestures of the portable device corresponds to the series of motion gestures recognized by the tracking system, wherein the pairing service is further configured to:
      generate plane aligned device gesture data by normalizing the device acceleration gesture data that is received from the portable device;
      integrate the tracked object position gesture data that is received from the tracking system to generate tracked object acceleration gesture data;
      generate plane aligned object gesture data by normalizing the tracked object acceleration gesture data; and
      determine a pairing match of the portable device with the tracking system by comparing the plane aligned device gesture data to the plane aligned object gesture data.

2. A pairing system as recited in claim 1, wherein the pairing service is configured to communicate a pairing match notification to both the tracking system and the portable device to establish pairing the portable device with the tracking system.

3. A pairing system as recited in claim 1, wherein the tracking system is configured to communicate with the portable device based on a pairing match of the portable device with the tracking system.

4. A pairing system as recited in claim 1, wherein the pairing service is a networked-based service configured for communication with the tracking system and with the portable device.

5. A pairing system as recited in claim 1, wherein the plane aligned device gesture data and the plane aligned object gesture data is generated based on an X,Y plane of the series of motion gestures.

6. A pairing system as recited in claim 5, wherein the plane aligned device gesture data and the plane aligned object gesture data is generated to minimize Z-coordinate motions from the series of motion gestures.

7. A method implemented at a pairing service, the method comprising:
   receiving device gesture data from a portable device that generates the device gesture data responsive to a series of motion gestures of the portable device;
   receiving object gesture data from a tracking system that recognizes the series of motion gestures of the portable device and generates the object gesture data;
   comparing the device gesture data and the object gesture data; and
   determining that the series of motion gestures of the portable device corresponds to the series of motion gestures recognized by the tracking system, and further comprising:
      generating plane aligned device gesture data by normalizing the device gesture data that is received from the portable device;
      integrating tracked object position gesture data that is received from the tracking system to generate tracked object acceleration gesture data;
      generating plane aligned object gesture data by normalizing the tracked object acceleration gesture data; and
      determining a pairing match of the portable device with the tracking system by comparing the plane aligned device gesture data to the plane aligned object gesture data.

8. A method as recited in claim 7, further comprising communicating the pairing match notification to both the tracking system and the portable device to establish pairing the portable device with the tracking system.

9. A method as recited in claim 7, wherein:
   the device gesture data is received as device acceleration gesture data from the portable device; and
   the object gesture data is received as tracked object position gesture data from the tracking system.

10. A method as recited in claim 7, wherein the plane aligned device gesture data and the plane aligned object gesture data is generated based on an X,Y plane of the series of motion gestures.

11. A computing device comprising:
    one or more processors;

one or more computer-readable storage media storing instructions which, when executed by the one or more processors, implement a pairing service configured to perform operations comprising:

receiving device gesture data from a portable device that generates the device gesture data responsive to a series of motion gestures of the portable device;

receiving object gesture data from a tracking system that recognizes the series of motion gestures of the portable device and generates the object gesture data;

comparing the device gesture data and the object gesture data; and determining that the series of motion gestures of the portable device corresponds to the series of motion gestures recognized by the tracking system, wherein:

the device gesture data is received as device acceleration gesture data from the portable device; and the object gesture data is received as tracked object position gesture data from the tracking system; and further comprising:

generating plane aligned device gesture data by normalizing the device acceleration gesture data that is received from the portable device;

integrating the tracked object position gesture data that is received from the tracking system to generate tracked object acceleration gesture data;

generating plane aligned object gesture data by normalizing the tracked object acceleration gesture data; and determining a pairing match of the portable device with the tracking system by comparing the plane aligned device gesture data to the plane aligned object gesture data.

12. A computing device as recited in claim 11, further comprising communicating the pairing match notification to both the tracking system and the portable device to establish pairing the portable device with the tracking system.

13. A computing device as recited in claim 11, wherein the plane aligned device gesture data and the plane aligned object gesture data is generated based on an X,Y plane of the series of motion gestures.

\* \* \* \* \*